(12) United States Patent
Babbitt et al.

(10) Patent No.: US 7,152,156 B1
(45) Date of Patent: Dec. 19, 2006

(54) SECURE INTERNET VOTING SYSTEM WITH BOOTABLE DISK

(75) Inventors: Victor Leroy Babbitt, Superior, CO (US); Simon Harry George Roberts, Superior, CO (US); Neil McClure, Reno, NV (US)

(73) Assignee: Hart InterCivic, Inc., Austin, TX (US)

( * ) Notice: Subject to any disclaimer, the term of this patent is extended or adjusted under 35 U.S.C. 154(b) by 0 days.

(21) Appl. No.: 09/505,821

(22) Filed: Feb. 17, 2000

(51) Int. Cl.
*G06F 9/445* (2006.01)

(52) U.S. Cl. .............................. 713/2; 713/1; 713/182; 713/183; 705/12; 705/50; 235/51

(58) Field of Classification Search .................. 705/50, 705/12; 713/1, 2, 182, 187; 235/51
See application file for complete search history.

(56) References Cited

U.S. PATENT DOCUMENTS

| | | | |
|---|---|---|---|
| 3,947,669 A * | 3/1976 | Simmons et al. ............. | 705/12 |
| 4,010,353 A * | 3/1977 | Moldovan et al. ........ | 235/54 F |
| 4,641,241 A * | 2/1987 | Boram ........................ | 705/12 |
| 5,278,753 A | 1/1994 | Graft, III | |
| 5,583,329 A | 12/1996 | Davis, III et al. | |
| 5,758,325 A | 5/1998 | Lohry et al. | |
| 6,081,793 A * | 6/2000 | Challener et al. ............. | 705/50 |
| 6,170,055 B1 * | 1/2001 | Meyer et al. ................... | 713/2 |
| 6,250,548 B1 * | 6/2001 | McClure et al. .............. | 235/51 |
| 6,279,109 B1 * | 8/2001 | Brundridge .................... | 713/2 |
| 6,529,992 B1 * | 3/2003 | Thomas et al. ................ | 711/1 |

FOREIGN PATENT DOCUMENTS

| | | | |
|---|---|---|---|
| EP | 0 292 053 | * | 11/1988 |
| EP | 04 419 335 A1 | * | 9/1990 |
| EP | 0 556 853 A2 | * | 2/1993 |
| EP | 0 743 620 A2 | * | 5/1996 |
| GB | 2045 497 | * | 10/1980 |
| WO | WO 96/02044 | * | 1/1996 |

OTHER PUBLICATIONS

A Repoert on the Feasibility of Internet Voting, California Internet Voting Task Force. Jan. 2000, the whole document.*
Pentagon's online Voting Program Deemed Too Risky, Washingtonpost.com, Article by Dan Keating, Washington Post Staff Writer, Jan. 22, 2004. Downloaded Jan. 22, 2004 fronm the internet.*

* cited by examiner

*Primary Examiner*—Taghi T. Arani
(74) *Attorney, Agent, or Firm*—Lathrop & Gage LC (57) ABSTRACT

An Internet voting system is provided with security against malicious software by using a bootable CD ROM to boot voter client machines for use in elections.

8 Claims, 7 Drawing Sheets

SECURE INTERNET VOTING SYSTEM WITH BOOTABLE DISK

BACKGROUND OF THE INVENTION

1. Field of the Invention

The present invention pertains to the field of computerized voting systems and, particularly, to security devices that prevent unauthorized tampering with election results. Still more specifically, the security devices include software that is specially designed to control operations of a computer from a designated disk drive, especially a read-only CD ROM.

2. Statement of the Problem

Elections are a fundamental process by which governments decide who will govern, whether the general public will accept new legislation, whether constitutions will be amended, and other matters of high importance. Voters formerly wrote down their choices on a ballot and anonymously cast the ballot in a ballot. The ballot was later retrieved and counted along with other cast ballots. This process embodied numerous problems. The process of counting votes to decide ballot issues was time consuming. In close elections, uncertainty over the correctness of the counts often required time consuming recounts in close elections. A single voter could sometimes cast numerous ballots because there was no comprehensive system to check for voter eligibility.

Election procedures have substantially changed in modern times. Modern elections are performed on a large scale with the aid of computerized systems. For example, U.S. Pat. No. 5,758,325 to Lohry et al. and U.S. Pat. No. 5,278,753 to Graft et al. show distributed hierarchical systems including a headquarters unit that oversees or governs the operations of multiple precinct units. In turn, the precinct units oversee or govern the operations of numerous voting booths. In both systems, data is transported between the headquarters unit and the precinct unit using a nonvolatile memory cartridge. This memory cartridge may include a CD ROM, EPROM, or other form of nonvolatile memory. Thus, communications that are transmitted by electronic signals between the precinct unit and the headquarters unit may later be confirmed after the precinct election data is delivered by hand to the headquarters. Security algorithms at headquarters verify that the nonvolatile memory module is authentic. This system prevents election tampering by the intercept of electronic signals.

A significant problem affecting democratic elections is low voter turnout. Many potential voters do not bother to register and, consequently, cannot vote. Other voters who are registered do not take the time to vote. This problem is related to the difficulty of voting because voters must often occupy several hours to travel to a precinct voting station, wait in line and vote. This problem occurs even when computerized voting systems are used.

One solution to low voter turnout is to provide easier access enabling more voters to participate in elections. This could be done using extant computer networks, e.g., the Internet, with appropriate security precautions in place. Nevertheless, use of non-dedicated or general purpose computer networks has heretofore been impracticable because these networks are insecure. For example, a skilled programmer could assemble a computer virus that would disrupt a national election either by causing the system to crash or by transmitting false results. Trojan horse programs can be created appearing to provide some useful service, but actually executing unexpected and unwanted functions, and these programs can be distributed to reside on many hard drives.

These risks exist because computer operating systems must be flexible to accommodate user needs, but this flexibility opens potential for abuse. The Microsoft Windows™* (Windows is a trademark of Microsoft Corporation) operating system is the most commonly used operating system in the world. It is generally considered impossible to boot Windows directly from a compact disk (CD) using a personal computer (PC) with "El Torito" compliant BIOS. As used herein, the term "boot" is a term of art that is know by computer programmers and computer users to mean the initialization procedures that are built into computers and software to provide operating system instructions and bring a computer into a made-ready to use configuration by the programming of electronic memory with machine program instructions. This impossibility exists because windows requires a writeable medium during boot. Thus, it is generally considered impossible to provide a program that boots from disk and seizes complete control of the computer in a manner that prevents computer viruses and Trojan horse programs from becoming active.

There remains a need to provide a secure voting system that can be accessed over a general purpose or non-dedicated computer network.

SOLUTION

The present invention overcomes the problems that are outlined above and advances the art by providing a secure voting system that can be accessed over a general purpose or non-dedicated computer network. This advance is accomplished by using a read only storage medium that is used to boot each individual computer for voting purposes. This read only storage medium is preferably a Windows based CD.

A bootable CD-ROM can be created despite the requirement that Windows and other modern operating systems must write during the boot operation. In its simplest terms, the invention pertains to adapting the boot process to load all operating system components that require writeability, such as the Windows registry, into RAM by creating a RAM Disk. While this process is described for creation of a Windows bootable CD, any application that requires a writeable medium during execution can be treated similarly, including potentially an Internet Voting System (IVS).

An IVS that boots directly from a Windows CD has distinct advantages because the user is immune to viruses. Internet voting software that was developed and tested thoroughly in the Windows system may be transferred to a bootable CD for distribution. Other advantages include being able to place a CD identification number (or voter identification number) on the CD for further authentication purposes. This fulfills a security maxim that a person be authorized by something he has (the CD) and something he knows (his password and other line authentication).

In the simplest of terms, an electronic voting system according to principles of the invention has at least one voter client and is improved by the use of a read only storage medium. This read only storage medium is preferably a CD ROM that is operably configured to boot the voter client for exclusive execution of program instructions found only on the read only storage medium at the voter client during the performance of an election. An exception is made to the exclusive execution of program instructions to permit the use of system device drivers as needed for operation of the voter client during the election process. These device drivers are preferably verified to assure that they are what they appear to be and they are not malicious software.

DETAILED DESCRIPTION OF THE PREFERRED EMBODIMENT

A Generalized Internet Voting System

Figure 1:
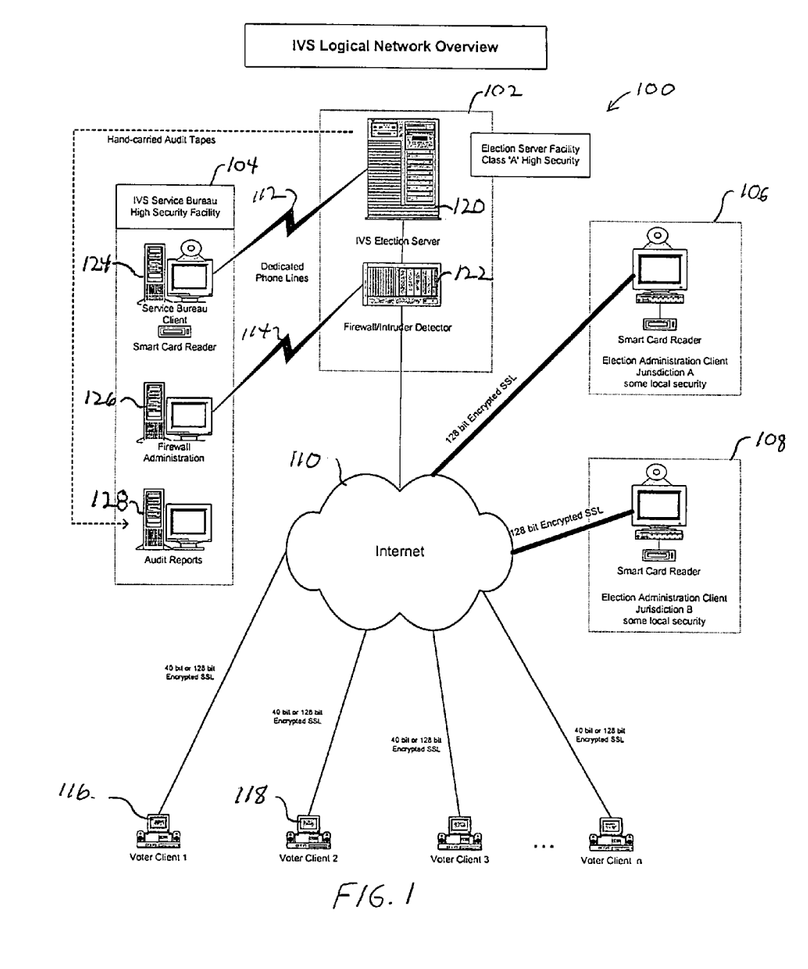
FIG. 1 is a system schematic diagram of an Internet voting system according to principles of the invention.

FIG. 1 depicts an overview of a logical IVS network 100. A central election server facility 102 is provided with a high level of physical and electronic security. This election server facility 102 is used to collect votes on a particular election. The election server facility 102 is validated by an IVS service bureau 104, which also transmits and receives election data to and from election server facility 102. A plurality of election administration clients, e.g., election administration clients 106 and 108 with local security are used to verify voters for particular elections with respect to a particular precinct or other local jurisdiction. All elements of IVS network 100 are connected by the Internet 110, except the election server facility 102 and IVS service bureau 104 are connected by dedicated lines 112 and 114. A plurality of voter clients, e.g., voter clients 116 and 118, are routed to appropriate election administration clients 106 and 108 by Internet addressing.

The election server facility 102 includes an IVS election server 120 that is coupled with a firewall intruder detector 122 to establish a telecommunications connection with the Internet 110. IVS election server 120 is used as a local server to perform election services collecting votes from voter clients 116 and 118. The firewall intruder 122 detector is a telecommunications front end that also has various security algorithms in place to verify and authenticate the voter clients. Multiple elections may be performed using a single election server 120 or a single election may be performed using a distributed network of election servers 120, as needed to handle the load.

Service bureau 104 is a central facility that interfaces with election server facility 102 to provide and collect data. A service bureau client 124 is connected with IVS election server 120 by a dedicated line 112. This service bureau client contains a plurality of ballot images for different elections, authentication codes, and telecommunications addresses, as well as all other data that is required to perform a secure election ion the Internet 110. In addition to receiving data from the service Bureau client 124, the IVS election server 120 also transmits election data to the service bureau client 124. Similarly, the firewall intruder detector 122 is coupled with a firewall administration server 126 via dedicated line 114 for the transmission of secure data including client authentication codes and all other data that is required for firewall administration. Tape or other storage devices, e.g., nonvolatile memory modules, are carried from the IVS election server 120 to an auditing device 128, which compares this data to that which is received by service bureau client 124. This audit prevents election tampering in the unlikely event that signals on dedicated line 112 are intercepted and manipulated.

local jurisdictions, e.g., precincts, are sometimes unable or unwilling to provide up to date information concerning voter eligibility to the IVS service bureau 104. For example, a state agency may be prohibited by law from dispensing voter lists. The local jurisdiction may also have a duty or requirement to itself verify voter eligibility and monitor or control progress of the election. For example, a local administrator may wish to deactivate the election system and close voting at a specified time. Local election clients 106 and 108 are incorporated into the system for purposes of establishing control at local levels whenever this control is required.

System Operation

Figure 2:
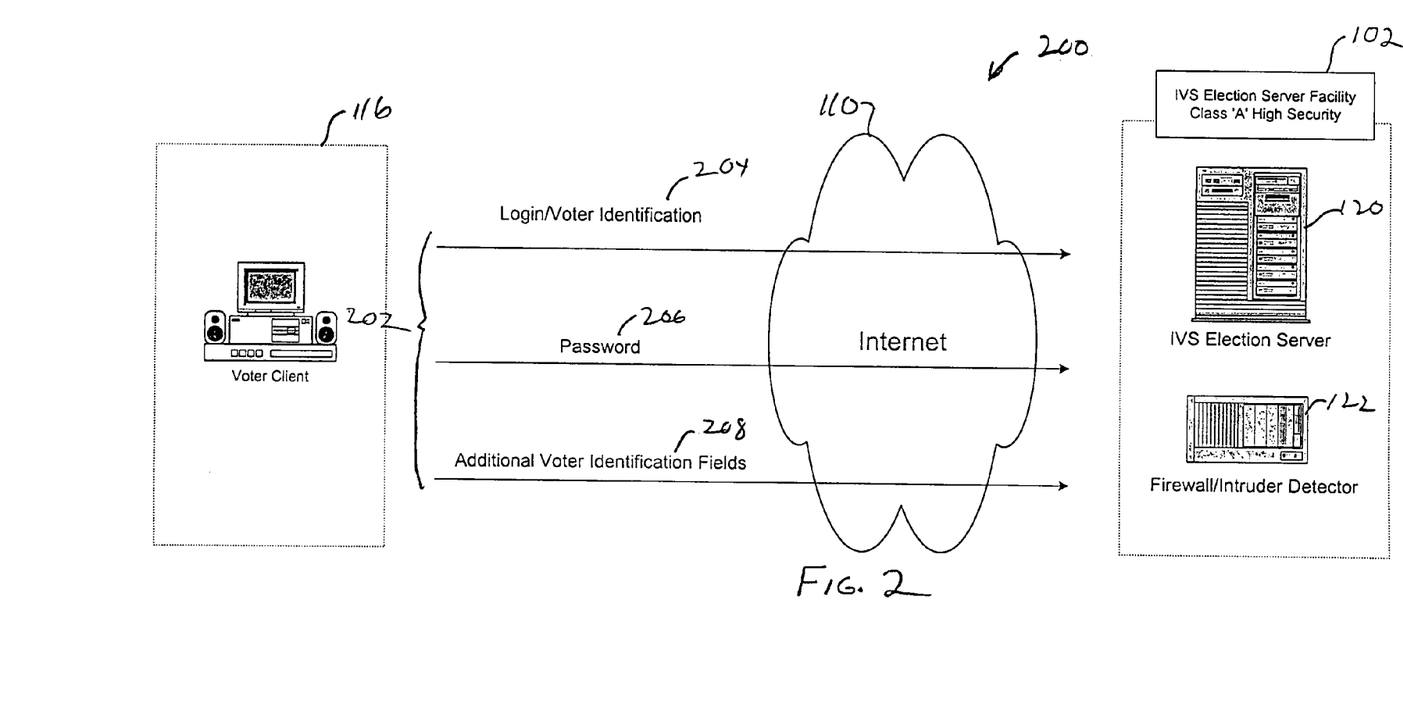
FIG. 2 depicts a multiple layer authentication procedure in use on the system shown in FIG. 1.

FIG. 2 demonstrates a process 200 including multiple authentication layers 202 for the login and authentication of voter clients. For example, voter client 116 contacts the IVS election server 102 through the Internet 110. There is an initial voter client login 204 including the transmission of a voter name followed by password verification 206. These steps 204 and 206 verify that the voter client at least knows the password. Authentication is preferably performed by the IVS election server 120, but may also be done by the firewall intruder detector 122 even with assistance from local election administration clients 106 or 108. Additional voter verification fields are verified in step 208. These additional fields include the use of smart cards at each voter client; personal voter information such as mother's maiden name and birthdate; biometerics; and special ID codes that verify a read only disk, e.g., a CD ROM, which is allocated to a particular voter client and password. Once used, the CD ROM ID code is deactivated at the IVS server 120 or other suitable location on the network, and the CD ROM cannot be used for additional voting.

These additional voter identification fields also include machine-specific information, such as a Pentium ID code, which is stored along with the vote. In this manner, the machine specific information may be investigated where it develops that a single computer is being used to cast a large number of votes. This type of machine specific information creates a substantial likelihood that anyone who attempts to interfere with an election in a large way will be investigated and caught.

The aforementioned security precautions might be defeated by malicious software running on a voter client machine or even on an Internet server. For example, a false Pentium ID code could be created using random alphanumeric sequences in an attempt to avoid investigation triggered by multiple votes from a single Pentium ID. According to principles of the invention, malicious software is prevented from running by using a read only storage device, e.g., a CD ROM, to boot each voter client machine. Use of the read only storage device does not permit other programs to run while the election program is running. It is also preferable that all computers in system 100 are booted from similar read only storage devices.

Figure 3:
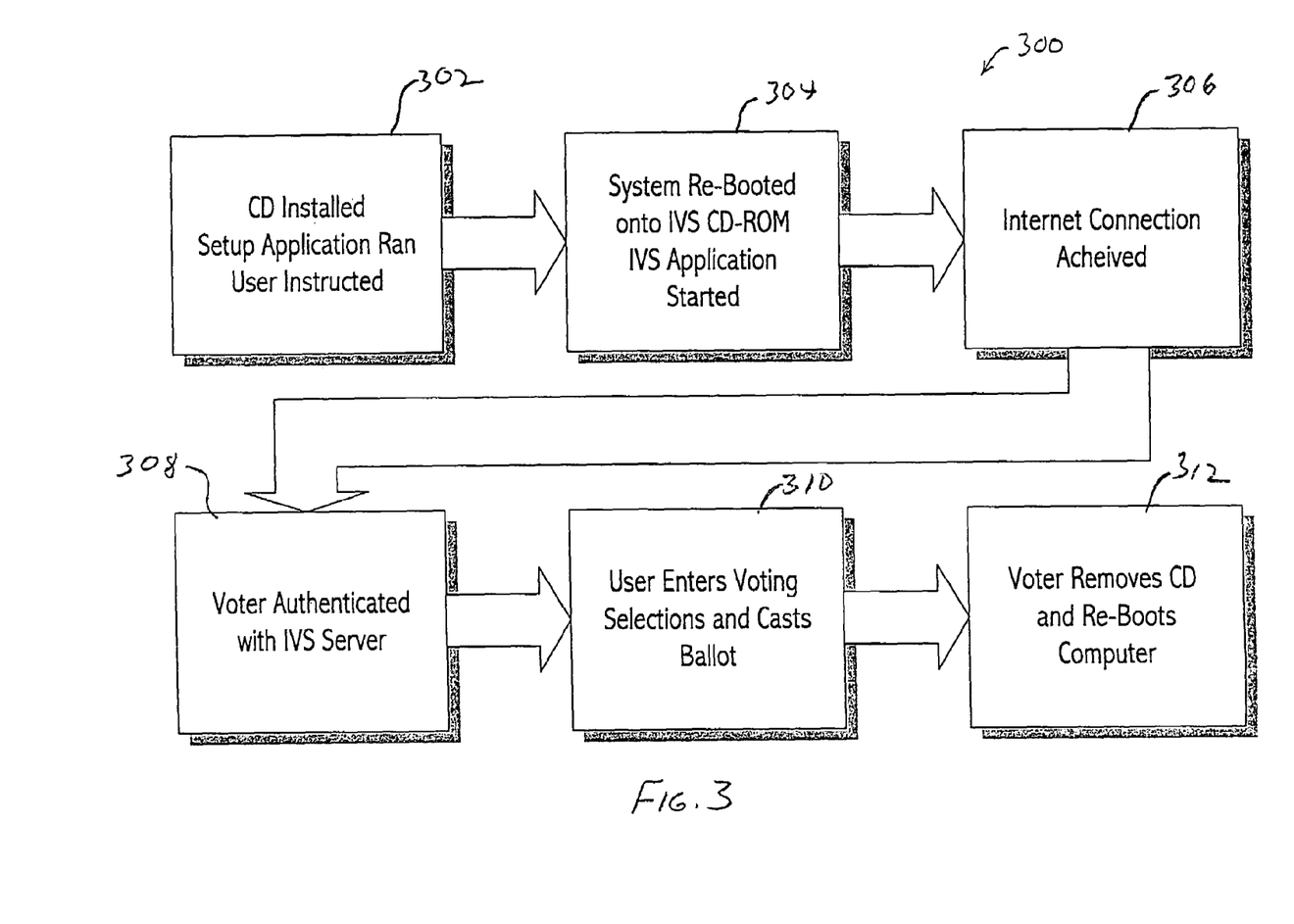
FIG. 3 is a schematic process diagram showing operation of the system of FIG. 1.

FIG. 3 is a schematic diagram of a process 300 for Internet voting using a bootable CD ROM or other read only storage device to prevent the operation of malicious software. The first part of this process 300 is performed in step 302. A voter client user, e.g., of voter client 116 (see FIG. 1) receives a CD ROM by mail or by hand delivery from the voting registrar. The user inserts this CD ROM into a disk drive on the user's computer in step 302. A program on the CD ROM runs and gathers information on the local system BIOS, network, modem connections, and configuration. This program autoruns, if possible. The setup program then instructs the user how to start the real IVS system program.

The real IVS system program is started in step 304 by rebooting the system onto the IVS CD ROM. The IVS application on the CD ROM is booted from the operating system on the CD ROM. An Internet connection is automatically achieved in step 306, and the voter client is authenticated with the IVS server pursuant to step 308 in the manner depicted by FIG. 2. The voter client/user may also fail authentication in step 308 in which case the process 300 terminates and IVS election server 102 deactivates the CD ROM to prevent it from being used. Authenticated voter clients proceed to step 310 for the entry of voting selections based upon a ballot image that is preferably contained on the CD ROM, but may also be transported to the voter client over the Internet. The user casts the ballot to conclude step 310. The user is then instructed to remove the CD ROM from the disk drive and reboot the machine in step 312.

Figure 4:
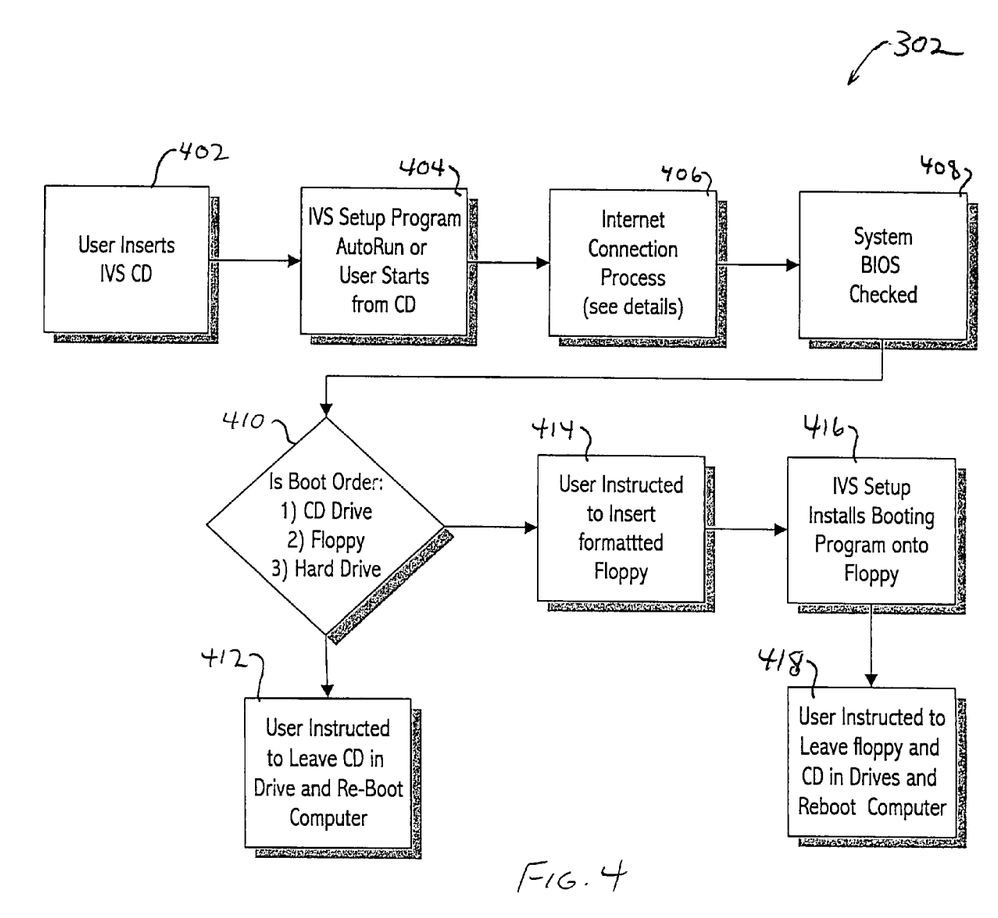
FIG. 4 provides additional detail with respect to a process step from FIG. 3.

FIG. 4 is a process diagram that provides additional detail with respect to a preferred process for implementing step 302 involving a preboot sequence of operations focusing upon "El Torito" compliant systems. A copy of that specification by C. E. Stevans and S. Merkin, "El Torito" Bootable CD ROM format Specification Version 1.0, IBM and Phoenix 20 pp. (1995) is incorporated by reference to the same extent as though fully disclosed herein.

In step 402, the user inserts the IVS CD into an appropriate disk drive on a running computer to execute a setup program on the IVS CD. This IVS setup program runs in step 404 by an autorun capability, or the user may manually execute the program if the autorun capability is unavailable. The setup program activates the voter client Internet connection in step 406 and checks the system BIOS in step 408. As determined in step 410, if the system is capable of booting from the CD ROM, the user is instructed to leave the CD ROM in the drive, remove all floppy disks, and reboot the computer in step 412. On the other hand, if the system BIOS does not support the "El Torito" bootable CD ROM specification, or if the BIOS boot order does not permit the voter client to boot from CD ROM prior to hard drive booting, then the IVS setup program instructs the user to insert a clean, formatted floppy disk in a floppy drive having boot capability in step 414. In step 416, the IVS setup program then copies onto the floppy a copy of the original El Torito compliant boot image that the CD carries. Pursuant to the El Torito specification, the boot image is sized to fit on a floppy, and any real operating system boot can only occur after the boot image is executed. This copying permits the system to boot from the IVS floppy, as needed, upon reboot of the system. The IVS setup program instructs the user to leave the floppy in the floppy drive, leave the CD ROM in the CD drive, and reboot the system in step 418.

If the voter client system is El Torito compliant but still does not boot from CD ROM, it is possible for the IVS setup program to alter the system BIOS settings on some machines, in order to change the EL Torito compliant BIOS's boot order and require the CD to boot first. Completion of these commands will make it possible to execute step 412 from step 410. If the user is required to make an IVS floppy, then the IVS setup program directs the user to leave both the floppy and the CD in their respective drives and reboot the local system.

Figure 5:
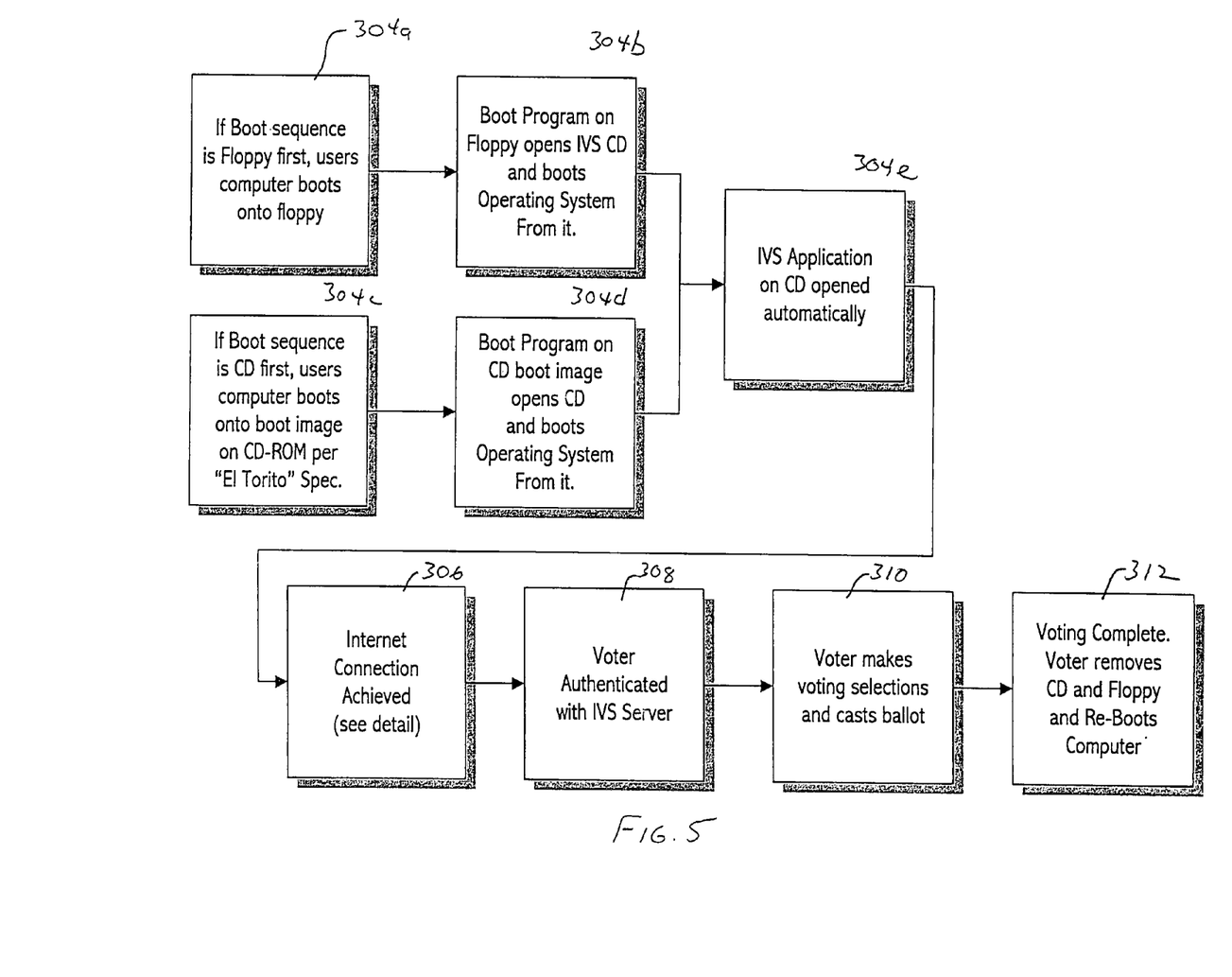
FIG. 5 provides additional detail with respect to a process step from FIG. 3.

FIG. 5 provides additional detail with respect to FIG. 3 involving the post boot process of step 304, which is now broken into steps 304a, 304b, 304c, 304d and 304e. In step 304a, if the voter client permits booting from floppy as provided for in step 302, the boot program on the floppy opens the IVS CD and boots the operating system from the CD using the boot disk image from the CD. The operating system on the CD opens the IVS voting application program on the CD in step 304e. In step 304c, if the voter client permits booting from the CD as provided for in step 302, the boot program on the floppy opens the IVS CD and boots the operating system from the CD in step 304d using the floppy sized boot image. The system reads this image like a floppy disk. The boot image has CD-ROM drivers that permit the IVS application program to be read and executed. Initialization procedures during the operating system startup execute the IVS application in step 304e. The remaining steps are as discussed in regard to FIG. 3.

Figure 6:
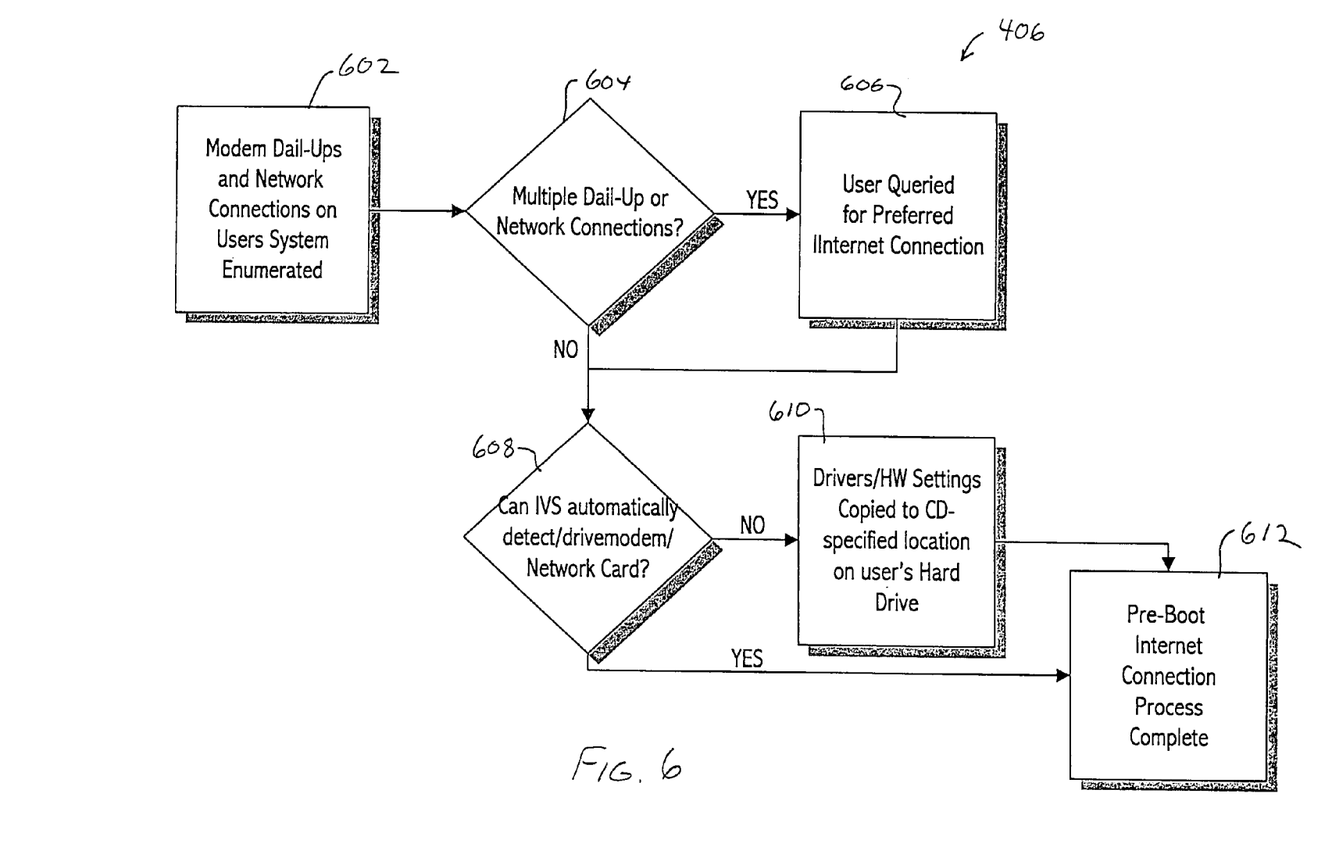
FIG. 6 provides additional detail with respect to a process step from FIG. 3.

FIG. 6 provides additional detail with respect to step 406, which provides a preboot Internet connection as shown in FIG. 4. Information on the voter client hard drive is valuable in terms of providing connectivity to the Internet. There are at least four options as to how an Internet connection may be achieved.

The first option is that of a sponsored Internet connection. A single Internet service provider provides Internet service for a particular election. Programs on the IVS CD search for a standard modem, automatically dial to the Internet service provider, and authenticate with the service provider using authentication information that is stored on the IVS CD. Useful information in this regard includes the modem telephone phone number for server access, authentication codes, login information, password information, and server address.

The sponsored Internet connection option offers a significant improvements to denial of service attacks in which web servers, routers, or domain name servers are flooded with millions of junk requests. Control over the reliability of the election service is maintained by keeping all of the election service within a single Internet service provider. These precautions are also justified:

- The Internet routers are configured as closely as practicable to convert the service into a private network for purposes of the election, which permits the Internet service provider and the election server to route traffic pursuant to election needs.
- The IVS application stores the Internet server address as a numerical address, which prevents the application from having to access a Domain Name Service computer to resolve an alphanumeric uniform resource locator or URL, thereby defeating one form of denial of service attack, where implementation of this feature is as simple as launching a web browser with the proper numerical server address target.
- The election server is provided with no uniform resource locator which means that there is no need to list the election web site with a domain name service provider, such as Network Solutions, since only a numerical address is used.
- The election server is provided with multiple server internet addresses, e.g., ten thousand IP addresses in an election with one million voters, which prevents a hacker from opening the IVS application to read the server addresses for purposes of implementing a denial of service attack on all ten thousand addresses. The election server would refuse to service more than one hundred simultaneous processes for any particular valid election IP address. A hacker would have to pen at least 10,000 CD's (an extreme minimum) to provide an effective denial of service attack.

A second option is to load information onto a floppy, which is available to the IVS CD. This information includes the dial up configuration for an Internet server, the network configuration, and network or special modem drivers. This information is loaded into the floppy by the IVS setup program. This option is less preferred in El Torito compliant systems at present due to program errors or bugs that make it difficult to access the a:\drive from the booted CD drive.

A third option is to inform the user that configuration information must be written down for entry into the IVS application program after boot. This information includes an ISP server address and a modem dial up number.

A fourth option is most preferred and includes the IVS setup program copying relevant configuration information and drivers into a location on the user's hard drive. This location is specified by the IVS CD. The IVS application program can access the data and drivers after executing from the bootable CD ROM. In the case of loading network drivers, this method carries a small risk that the drivers themselves are corrupted and include Trojan horse programs. This risk can be mitigated by firewall protection measures including verification that the drivers occupy the correct amount of memory for verification, substitution with equivalent drivers from a known secure source (e.g., IVS election server 102), and interactive checking procedures such as polling to produce an expected response. There is considered to be no risk from accessing the configuration data, which contains no code and is treated as simple text data from the user's hard drive.

This fourth option is implemented as shown in FIG. 6. In step 602, the setup program enumerates all modem dial ups and network configurations on the voter client system. These include all possible Internet connections including networks and modem dial ups from the voter client system. As determined in step 604, if more than one method of Internet access exists, the user is queried as to the preferred method. Once the method of Internet access has been determined, the setup program attempts to detect a drivemodem or network card in step 608. If these cannot be detected, drivers and hardware settings are copied onto the voter client hard drive to a location specified by the setup program in step 610. If a drive modem or network card can be detected, then the preboot Internet connection process is complete in step 612.

Figure 7:
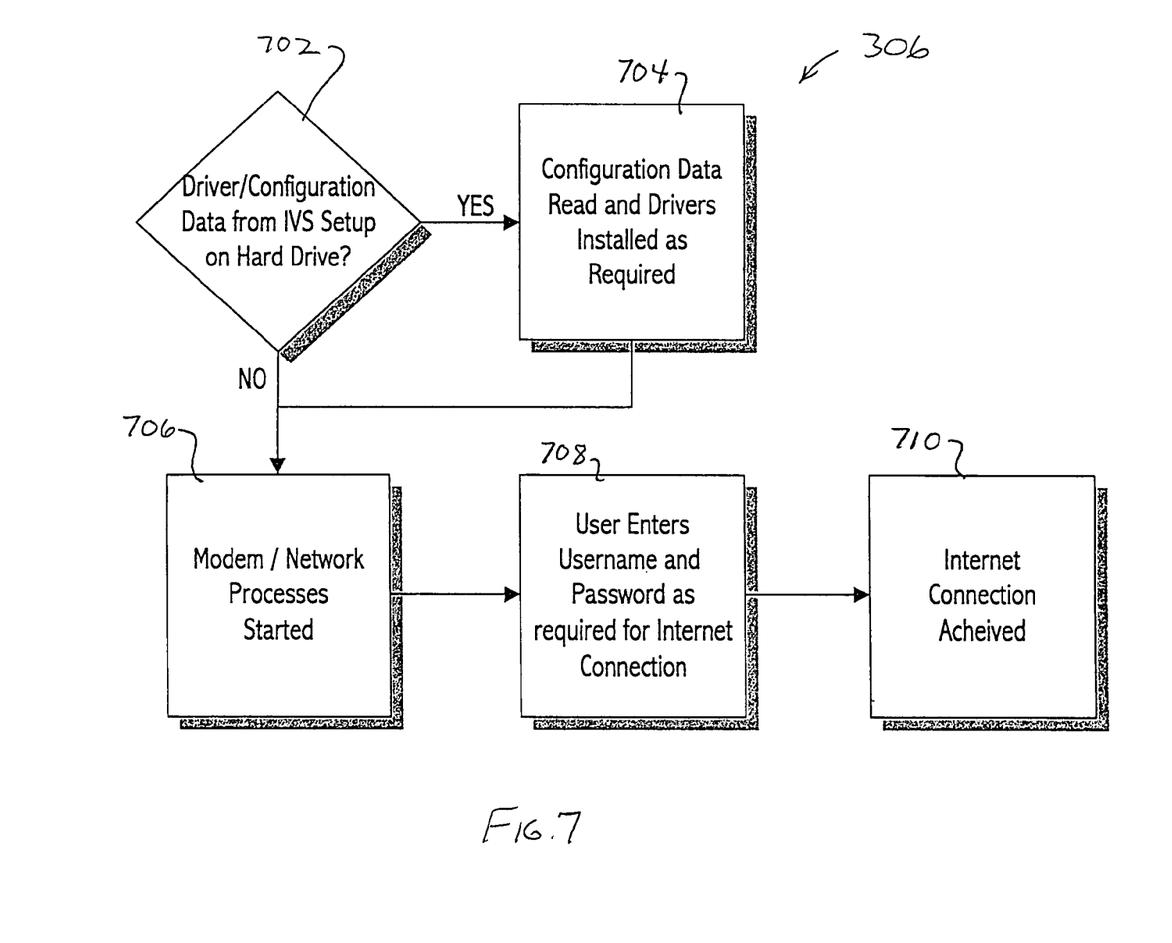
FIG. 7 provides additional detail with respect to a process step from FIG. 3.

FIG. 7 provides additional detail with respect to the post boot Internet connection step 306, as shown in FIG. 3. Once the voter client system is rebooted after setup initialization in step 304 (see FIG. 3), the IVS application program checks the specified hard drive location for configuration data or drivers in step 702. If the configuration data or drivers are found, in step 704 the IVS application program reads the data and installs the drivers as required. If the data and drivers are not found, it is assumed that the default drivers and configuration data found on the CD ROM are sufficient, and modem processes including a dial up connection to the user's Internet service provider are started in step 706. The user enters a username and password as required top complete the Internet connection in step 708, and the Internet connection is completed by normal means in step 710.

Booting Windows From CD-ROM

The vast majority of personal computers operate using the Windows operating system. Thus, it is preferred to use Windows related procedures to create and boot a bootable CD ROM. The following procedure works for Windows 95b up through Windows 98. A different procedure would need be developed for creating Bootable CD-ROMs of Windows NT or 2000, as these OS have a very different structure.

A CD ROM burner and the respective software as well as at least 500 Mbytes of hard disk space and a few freeware programs from the Internet, as described later, to make a bootable CD ROM. Also, Windows should be installed on a computer.

The Windows registry is loaded onto a RAM disk. A RAM disk is a part of main memory pretending to be a normal hard disk, but the RAM disk is volatile in the sense that it does not retain its memory beyond a reboot. Only the registry files need be copied. Not all Windows files must be copied. Accordingly, the RAM disk space that is required for the 40 MB of a minimal Windows installation is reduced to less than 4 MB. All other Windows will not change after startup and these remain on the CD. In this manner, Windows will run on a combination of RAM disk and CD ROM. Thus, the registry has the write access that it requires' without a hard disk being present.

It is helpful to create several hard disk directories including c:\w for storing the CD ROM boot image and c:\cdrom to store everything that will afterwards be put on CD. The data, which needs to go into RAM disk, is initially saved in c:\cdrom\ramdisk. The RAM disk's 'Windows directory' will be c:\cdrom\ramdisk\w. Also, the system configuration files including msdos.sys, io.sys, config.sys and autoexec.bat are stored in c:\backup. The c:\w directory should also hold dbibuff.sys, himen.sys, ifshlp.sys and setver.exe from the Windows directory, as well as attrib.exe, keyb.com, keyboard.sys, mscdex.exe, subst.exe, xcopy.exe, xcopy32.exe. For Windows 98, xcopy32.mod is also stored from c:\windows\command. The DOS driver(s) for the CD ROM drive and a RAM disk driver are also stored in a suitable directory. Ramdrive.sys, which comes with Windows, is unsuitable because it cannot be assigned a drive letter. A well-tested alternative is xmsdsk.exe, a publicly available free utility, among others, that can be downloaded from the Internet.

Before re-installing Windows, delete c:\config.sys together with c:\autoexec.bat, and then create a new autoexec.bat containing the following:

c:\w\subst.exe x: c:\cdrom path c:\;c:\w

The system will later run from CD and the CD ROM drive that can only be assigned a drive letter which hasn't been assigned yet. The system should be installed on a drive with a letter from the back of the alphabet. This convention is important to make all registry links and paths partition-independent. Instead of setting up a number of dummy partitions, the subst DOS command assigns a drive letter to a hard disk directory of your choice. The first line in autoexec.bat makes the c:\cdrom drive accessible as drive X, and the CD ROM drive is accessed in the same manner after booting the system.

The overwriting of existing installations with the following Windows setup is avoided by renaming all win.com and system.ini files in all Windows directories on all partitions, even in the current partition. A similar renaming process applies to files called system.dat. However, these cannot be accessed until after leaving Windows and rebooting the computer to its command line. The system.dat files are made accessible by typing attrib -r -h -s and giving each file a new name. The basis for taking this precaution is that windows looks for it will look for a system.dat file—which contains the registry—on all the other partitions and will start Windows from the other partition when Windows cannot find the registry in the place it is looking for during startup. This access of system.dat files from the wrong partition may cause the wrong system.dat to be booted and might even influence other installations.

Windows is reinstalled by starting setup.exe from the hard disk directory containing the Win9x branch that was copied from the original Windows CD. Setup will complain that subst.exe is loaded. Ignore this message by pressing ESC against the program's recommendation. Use X:\W as the installation path.

The first installation reboot must be done from the Windows startup floppy that was previously made. Therefore, ignore the instruction to remove all floppy disks from the drives. When installed on a network drive—and virtual drives created with subst belong in this category—Windows does not automatically choose the right paths for autoexec.bat and config.sys. Therefore, the first reboot must be done from the startup floppy, enabling correction of these paths, and add ifship.sys—a missing file which supports VFAT—to the config.sys file. Use edit to load c:\config.sys from the command line and make sure it contains at least the following lines with correct path instructions:

devicehigh=c:\w\himem.sys
    devicehigh=c:\w\ifshlp.sys
    devicehigh=c:\w\dblbuff.sys
    devicehigh=c:\w\setver.exe Check autoexec.bat in the same way. The path must be extended to include the Windows and Windows\Command directories on our future CD. Without this information, the system cannot find win.com when booted from CD. This file initializes the GUI mode startup process. The minimal configuration looks like this:

c:\w\subst.exe x: c:\cdrom
    path c:\w;x:\w;x:\w\command;x:\w\system Remove the startup floppy, restart the computer using ctrl-alt-del, and finish the installation. The Windows setup may now be adapted to include user preferences. Whatever configuration is made will be eliminated at a later time because the registry will reside in a RAM disk. Therefore, all required drivers, e.g., for sound and graphics boards, are stored on the CD, as are any other programs which are to be included on the CD. The following steps are made a bit easier by installing the TweakUI utility. In Windows 98, this utility is found in the \tools\reskit\powertoy directory on the Windows CD. A free Windows 95 version is available from the Internet.

Preparing a RAM disk for the registry again involves the DOS command subst. Add the following line as the second one to c:\autoexec.bat:

c:\w\subst.exe w: c:\cdrom\ramdisk

Windows expects to find the registry files in \msdos.sys on the startup volume. The registry files are first made accessible with attrib -s -h -r. The path instructions are adapted in the first four lines:

[Paths] WinDir=w:\w
    WinBootDir=w:\w
    HostWinBootDrv=w While editing msdos.sys, add a line at the end of the last text section with     DisableLog=1

If there's already a DisableLog=0, don't add another entry for this, but just change it to 1.

The registry should be renamed to prevent the system from using a hard disk system.dat when booting from CD. The registry name is noted in c:\io.sys, which is rendered visible and edited. Then, edit it in a hex editor and search for the character sequence system.dat and change it to system.tat. This operation assures that only files named system.tat will be recognized as registry files. Any system.dat files are ignored.

This hexal patch is recommended for Windows 95, but not for Windows 98. Here, the registry name is not only wired into the io.sys file but also in the program files that are responsible for automatically checking the registry during startup. If the change is made, a registry error message occurs every time the computer boots. In addition, scanregw.exe must be prevented form being loaded, for example by deactivating it with msconfig.exe in its autostart folder.

The next Windows reboot works smoothly if the start menu folder from c:\cdrom\w is now copied to c:\cdrom\ramdisk\w.

The temporary RAM disk substitute is filled by closing Windows and starting a command prompt only. Copy system.dat, system.ini, user.dat and win.ini from c:\cdrom\w to c:\cdrom\ramdisk\w after having made them accessible with attrib. In case the io.sys patch is included, rename the system.dat file in the target directory to system.tat.

Restarting Windows will now make the program use the drive W: registry. However, the system needs write access not only to the registry but also to the Windows directory. Therefore, this directory should be put into RAM disk after booting from CD. Its position is noted in the registry at the KLM\Software\Microsoft\Windows\CurrentVersion key. Use regedit.exe to change the value systemroot to 'w:\w'.

At present, the start menu resides in the RAM disk that is simulated with subst, but it only uses up unnecessary space there, and should be moved back to the CD. Start TweakUI from the system controls folder, choose 'General' and readjust the 'Special Folders' entries for 'Programs', 'Start Menu' and 'Startup' to read 'x:\w\startmenu or the respective subdirectories. For Windows 98, also readjust the 'Desktop' entry to read 'x:\w\Desktop'. After rebooting, the w:\w\Startmenu and w:\w\Desktop folders can be deleted.

Setting up a real RAM disk requires rebooting to DOS again. The command attrib -s -h -r c:\cdrom\ramdisk\k*.* /s removes flags in the files which are to go into the RAM disk. Now, use edit in c:\autoexec.bat to delete or disable the line subst w: c:\cdrom\ramdisk per REM. In its place, add the following lines:

c:\w\xmsdsk 4000 w: /y
    copy c:\command.com w:\
    set COMSPEC=w:\command.com
    c:\w\xcopy c:\cdrom\ramdisk\*.* w:\/s During startup, this sets up a 4000 KByte RAM disk instead of a subst drive. The copy commands fill it with a command line interpreter, which has been designated current shell via COMSPEC, and with the contents of the directory containing the registry.

If everything runs smoothly after rebooting, you can delete all files in c:\cdrom\ramdisk\w except system.ini, user.dat, win.ini, control.ini and system.tat or system.dat respectively.

An image of a bootable startup disk is required to create a bootable CD. Therefore, create a normal startup disk using format a:/s or sys a:. Copy the patched io.sys and msdos.sys files as well as the config.sys and autoexec.bat you just made from c:\, replacing existing files. In addition, put the entire c:\w directory onto the disk.

Now, a:\config.sys must be amended to include the right paths and any CD ROM driver(s). The result should look like this:

```
devicehigh=a:\w\himem.sys
devicehigh=a:\w\ifshlp.sys
devicehigh=a:\w\dblbuff.sys
devicehigh=a:\w\setver.exe
device=a:\w\aspi8dos.sys
device=a:\w\aspicd.sys /D:CD001
```

Again, paths must also be changed in a:\autoexec.bat. Additionally, the subst command must be replaced with mscdex.exe. The finished file should read like this:

```
a:\w\mscdex.exe /D:CD001 /L:X /M:50
a:\w\xmsdsk 4000 w: /y
copy a:\command.com w:\
set COMSPEC=w:\command.com
a:\w\xcopy x:\ramdisk\*.* w:\/S
path w:\;x:\w;x:\w\command; x:\w\system
x:
```

Make sure the mscdex.exe data buffer isn't too small. With the usual /M:12 and a fast drive, Windows might get stuck during startup when the drive doesn't provide the data fast enough. The parameter /L:X states that the CD ROM drive is to be given the drive letter X:.

Make sure attrib -s -h c:\cdrom\*.* /s are used to remove unwanted flags from the directory contents to be copied before burning your CD. The CD is to have a Joliet file system and contain all of c:\cdrom in its root directory.

The following Internet addresses are useful in obtaining software for the purposes described above:

Free Software For DOS,
http://www.geocities.com/SiliconValley/Lakes/1401/softlib1.htm
Windows 95 Power Toys Set,
http://www.microsoft.com/windows95/downloads/contents/wutoys/w 95pwrtoysset/
Winimage,
http://www.winimage.com/

Those skilled in the art will understand that the preferred embodiments, as described hereinabove, may be subjected to apparent modifications without departing from the true scope and spirit of the invention. Accordingly, the inventors hereby declare their intention to rely upon the Doctrine of Equivalents, in order to protect their full rights in the invention. For example, instructions that have been described above as being provided by floppy disk or CD ROMs may also be provided interactively form other computers or from ROM. Functions that have been ascribed as being performed at one computer or node may be transferred to other computers or other nodes.

We claim:

1. A secure program storage device comprising:
   a storage medium bearing program instructions operable for booting a computer by exclusive execution of program instructions found only on the storage medium at the computer, the exclusive execution of program instructions excepting system device drivers as needed for operation of the computer;
   means for identifying system device drivers in normal use on said computer and for providing correspondingly appropriate system device drivers for use in conjunction with said program instructions, and
   means for verifying system device drivers In use by the computer during execution of said program instructions to assure that the drivers are not corrupted,
   the program instructions on the storage medium being further operable for execution of a voting application program configured to permit a voter to cast votes in an election.

2. The secure program storage device as set forth in claim 1 wherein said storage medium is a CD ROM.

3. The secure program storage device as set forth in claim 1 including program instructions for writing to a floppy disk all system information and device drivers that are required for operation of the computer and which are not found on the read only storage medium.

4. The secure program storage device as set forth in claim 3 including program instructions for diagnosing whether a read mechanism for the read only storage device is capable of booting the computer.

5. The secure program storage device as set forth in claim 3 including program instructions for making a floppy startup disk when the read mechanism for the read only storage device is not capable of booting the computer.

6. The secure program storage device as set forth in claim 5 including program instructions for using the floppy startup disk to transfer program control to the read only storage device for exclusive execution of program instructions found on the read only storage device.

7. The secure program storage device as set forth in claim 1 wherein said program instructions are operable to boot said computer as a voter client on a network election system.

8. The secure program storage device as set forth in claim 1 wherein said program instructions are operable to boot said computer as a voter client on a network election system consisting essentially of a sponsored Internet connection.

* * * * *